(12) United States Patent
Savage

(10) Patent No.: US 7,481,285 B1
(45) Date of Patent: Jan. 27, 2009

(54) LIFTING AND STEERING ASSEMBLY

(76) Inventor: Bobbie Savage, 4200 Terrace Dr., Farmington, NM (US) 87402

( * ) Notice: Subject to any disclaimer, the term of this patent is extended or adjusted under 35 U.S.C. 154(b) by 654 days.

(21) Appl. No.: 11/097,716

(22) Filed: Apr. 1, 2005

(51) Int. Cl.
*B62D 51/06* (2006.01)
*B60S 9/02* (2006.01)

(52) U.S. Cl. .......................... 180/8.1; 180/8.5; 180/8.6; 280/763.1; 280/762; 280/760.1

(58) Field of Classification Search ................. 180/8.1, 180/8.5, 8.6; 280/763.1, 762, 760.1
See application file for complete search history.

(56) References Cited

U.S. PATENT DOCUMENTS

| | | | | |
|---|---|---|---|---|
| 1,568,109 A | * | 1/1926 | Venzlaff | 180/8.6 |
| 1,687,306 A | * | 10/1928 | O'Toole | 299/44 |
| 3,335,809 A | * | 8/1967 | Guinot | 180/8.1 |
| 3,740,077 A | * | 6/1973 | Williams | 280/475 |
| 3,807,519 A | | 4/1974 | Patch | |
| 3,841,663 A | * | 10/1974 | Proffit | 280/475 |
| 3,853,196 A | | 12/1974 | Guest | |
| 4,241,803 A | * | 12/1980 | Lauber | 180/8.1 |
| 4,444,416 A | * | 4/1984 | Soderstrom | 280/763.1 |
| 4,657,463 A | | 4/1987 | Pipes | |
| 4,674,949 A | * | 6/1987 | Kroczynski | 414/749.1 |
| 4,938,305 A | | 7/1990 | Park | |
| 5,316,100 A | | 5/1994 | Juan | |
| 5,453,931 A | | 9/1995 | Watts, Jr. | |
| 5,921,336 A | | 7/1999 | Reed | |
| 6,079,510 A | * | 6/2000 | Miyamoto | 180/8.3 |
| 6,202,774 B1 | | 3/2001 | Claassen et al. | |
| 6,811,161 B1 | * | 11/2004 | Anderson | 280/4 |
| 7,004,457 B2 | * | 2/2006 | Jackson et al. | 254/423 |
| 2003/0183427 A1 | * | 10/2003 | Tojo et al. | 180/8.1 |
| 2006/0243499 A1 | * | 11/2006 | Hosoda | 180/8.5 |

* cited by examiner

*Primary Examiner*—Paul N Dickson
*Assistant Examiner*—Marlon A Arce Diaz
(74) *Attorney, Agent, or Firm*—Jeffrey A. Proehl; Woods, Fuller, Shultz & Smith, PC

(57) ABSTRACT

A lifting and steering assembly for permitting a vehicle to be turned in a small area. The lifting and steering assembly includes at least one turning assembly for being coupled to the vehicle. The turning assembly comprises a shaft member is selectively extended from the vehicle whereby the turning assembly selectively engages the support surface to lift a portion of the vehicle off of the support surface. The turning assembly comprises an engaging means for engaging the support surface when shaft member of the turning assembly is extended from the vehicle. The engaging means is coupled to the shaft member. The engaging means is for advancing along the support surface to rotate the portion of the vehicle lifted off the support surface around a portion of the vehicle still in contact with the support surface.

20 Claims, 5 Drawing Sheets

LIFTING AND STEERING ASSEMBLY

BACKGROUND OF THE INVENTION

1. Field of the Invention

The present invention relates to direction changing devices and more particularly pertains to a new lifting and steering assembly for permitting a vehicle to be turned in a small area.

2. Description of the Prior Art

A number of direction changing devices have been proposed for vehicles and other objects, for example U.S. Pat. No. 5,453,931 to Watts, Jr. provides a navigating robot that is capable of navigating across a surface to print a layout on the surface or perform the work at the coordinates provided which are preprogrammed into the robot which require a user to know where the robot is going to be and needs to go prior to programming. U.S. Pat. No. 4,657,463 to Pipes provides an automated guided vehicle that is used to transport loads from one predetermined location to another predetermined location thus requiring the route to be traveled by the vehicle to preprogrammed in the vehicle.

U.S. Pat. No. 4,938,305 to Park provides a direction changing apparatus for a vehicle that is positioned under the vehicle and extends downwardly to lift the vehicle off the ground and can slide the vehicle left or right in addition to rotating the vehicle around the axis of the apparatus to allow the direction of the vehicle to be altered in small areas may be destabilized if the vehicle is slid to the extreme left or right and is rotated which may cause the vehicle to tip and become unstable. U.S. Pat. No. 5,316,100 to Juan provides direction changing device for a handling trolley that is extended from the trolley and lifts the trolley from the surface and rotates the trolley to allow the direction of the trolley to be change in a limited space but may destabilize the trolley in that the device that changes the direction of the trolley requires the body of the trolley to compensate for the weight of the cargo being carried and my tip causing the cargo to shift and fall if the cargo is heavier that the body of the trolley.

U.S. Pat. No. 3,853,196 to Guest provides a self-propelling mechanism that uses a pair of feet that swing down to engage the ground and lift a the core drilling apparatus and slide it along the skids coupled to the core drilling apparatus and then allows the skids to be slid forward to allow the core drilling apparatus to be advanced along the surface. U.S. Pat. No. 6,202,774 to Claasen provides a module for transporting heavy loads that raise the load and allow the load to slide forward in a step-wise manner. U.S. Pat. No. 5,921,336 to Reed provides a walking structure device that has a plurality of lifting jacks for lifting a drilling rig structure and a plurality of jack pads that the drilling rig is advanced along when the drilling rig is raised to move along the ground surface. U.S. Pat. No. 3,807,519 to Patch provides a motive drive for heavy machinery that has a walking mechanism to lifts the heavy machinery on a support pad and then is walked forward to move the heavy machinery across the ground.

A disadvantage of some of the above listed patents is that the entirety of the object is lifted off the ground and thereby the direction changing device is thereby required to balance the object and if the object is unbalanced may cause the direction changing device to tip and possibly damaged the object.

In these respects, the lifting and steering assembly according to the present invention substantially departs from the conventional concepts and designs of the prior art, and in so doing provides an apparatus primarily developed for the purpose of permitting a vehicle to be turned in a small area.

SUMMARY OF THE INVENTION

In view of the foregoing disadvantages inherent in the known types of direction changing devices now present in the prior art, the present invention provides a new lifting and steering assembly construction wherein the same can be utilized for permitting a vehicle to be turned in a small area.

To attain this, the present invention generally comprises at least one turning assembly for being coupled to the vehicle. The turning assembly comprises a shaft member that is selectively extendable from the vehicle so that the turning assembly selectively engages the support surface to lift a portion of the vehicle off of the support surface. The turning assembly comprises an engaging means for engaging the support surface when shaft member of the turning assembly is extended from the vehicle. The engaging means is coupled to the shaft member. The engaging means advances along the support surface to rotate the portion of the vehicle lifted off the support surface around a portion of the vehicle still in contact with the support surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is that the turning assembly is mounted at an end of the vehicle to raise the associated end of the vehicle while the other end of the vehicle remains in contact with the support surface to thereby stabilize the vehicle during the turning process. As a result, the turning assembly needs to lift only a portion of the weight of the vehicle, and not the entire vehicle or the entire weight of the vehicle.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
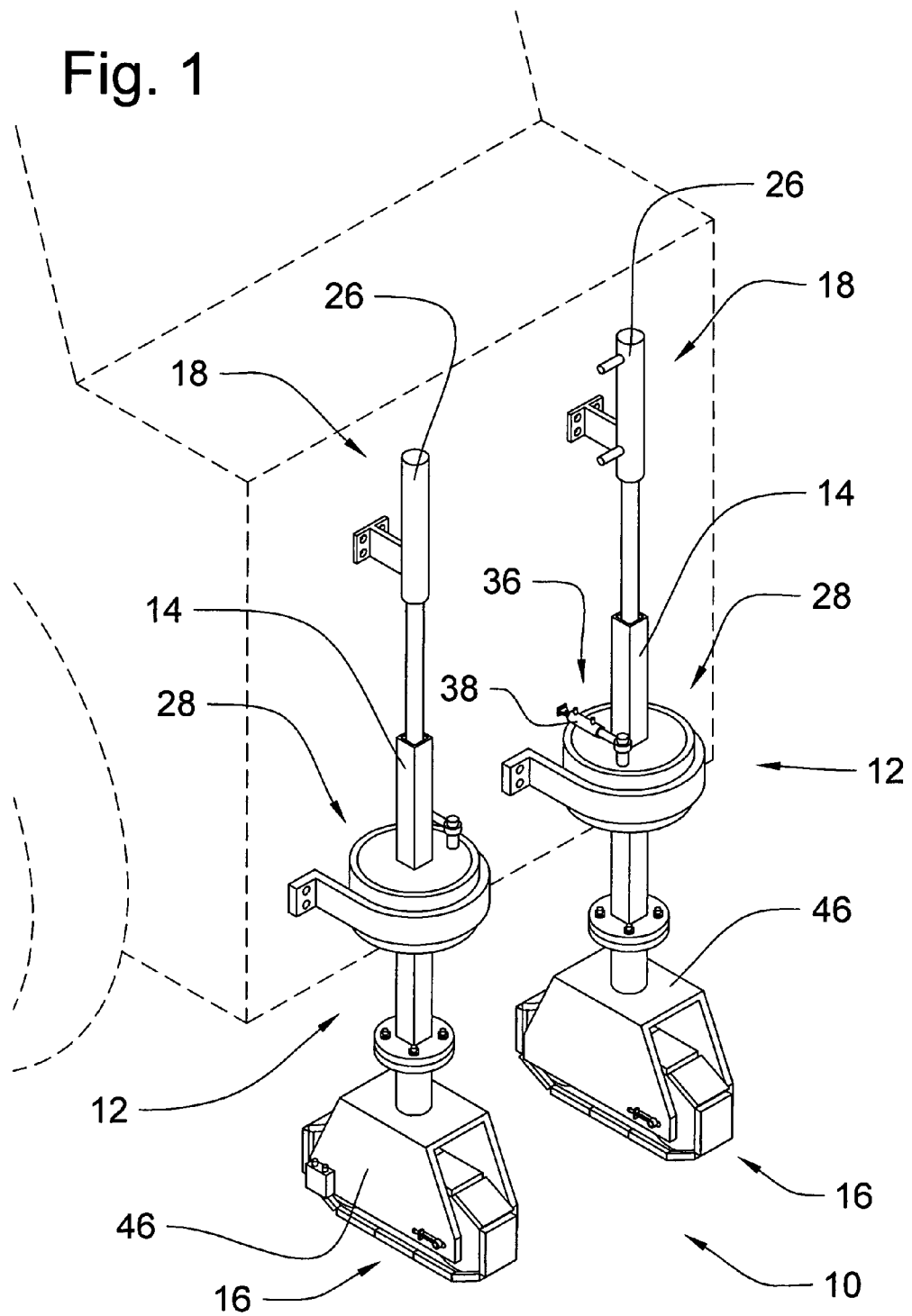
FIG. 1 is a perspective view of a new lifting and steering assembly according to the present invention shown in use.

With reference now to the drawings, and in particular to FIGS. 1 through 5 thereof, a new lifting and steering assembly embodying the principles and concepts of the present invention and generally designated by the reference numeral 10 will be described.

As best illustrated in FIGS. 1 through 5, the lifting and steering assembly 10 generally comprises at least one turning assembly 12 for being coupled to the vehicle. Preferably, but not necessarily, a pair of turning assemblies 12 may be mounted on the same end of the vehicle to facilitate maintaining the balance of the end of the vehicle when the end of the vehicle is being moved. The turning assembly 12 may include a shaft member 14 that is selectively extendable from the vehicle to cause the turning assembly 12 to selectively engage the support surface beneath the vehicle to lift a portion of the vehicle off of the support surface. The vehicle could be a vehicle with a relatively large turning radius, such as a large earth moving vehicle, for example a road grader, although many types of vehicle me benefit from the invention.

For the purposes of this disclosure, lifting an end of a vehicle comprises lifting or raising the parts of the vehicle that are normally in contact with the support surface out of substantial contact with the support surface to permit relative movement therebetween. Typically, this is accomplished by applying an upward force on the body of the vehicle, and the wheels or tracks or other ground contacting structure are raised as a result. Optionally, the invention may act directly on the wheels or tracks or ground contacting structure.

The turning assembly 12 comprises an engaging means 16 for engaging the support surface when shaft member 14 of the turning assembly 12 is extended from the vehicle. The engaging means 16 is coupled to the shaft member 14. The engaging means 16 is for advancing or moving along the support surface to rotate the portion of the vehicle lifted off the support surface around a portion of the vehicle still in contact with the support surface.

The turning assembly 12 comprises a lifting means 18 for extending the engaging means 16 from the vehicle to engage the support surface. The lifting means 18 is operationally coupled to the shaft member 14 so that the lifting means 18 is able to selectively extend the engaging means 16 to a lowered position and retract the engaging means 16 to a raised position with respect to the vehicle.

The turning assembly 12 may include a mounting member 20. The mounting member 20 is coupled to the lifting means 18. The mounting member 20 mountable to the vehicle to secure the lifting means 18 to the vehicle.

The mounting member 20 comprises at least one mounting portion 22. The mounting portion 22 is securable to the vehicle (such as a location on the body of the vehicle) to secure the lifting means 18 to the vehicle. The mounting member 20 comprises an extension portion 24. The extension portion 24 extends between the mounting portion 22 and the lifting means 18. The extension portion 24 of the mounting member 20 functions to position the lifting means 18 at a desired distance from the vehicle.

The lifting means 18 comprises a ram member 26. The ram member 26 is mounted on the shaft member 14 for selectively extending and retracting the engaging means 16 with respect to the vehicle. When coupled to the vehicle, the ram member 26 allows a user of the vehicle to selectively extend and retract the engaging means 16 with respect to the vehicle by actuating the ram member 26.

The turning assembly 12 may include a rotational means 28 for rotating the engaging means 16 with respect to the lifting means 18. The rotational means 28 is connected to the shaft member 14 for selectively rotating the shaft member 14 to control the direction of travel of the engaging means 16 when the engaging means 16 is advancing along the support surface.

The rotational means 28 may comprise a stationary race 30 and a rotational race 32. The rotational race 32 is coupled to the stationary race 30 to permit rotation of the rotational race 32 with respect to the stationary race 30. The stationary race 30 is coupled to the vehicle to inhibit rotation of the stationary race 30 relative to the vehicle. The rotational race 32 is mounted on the shaft member 14 so that actuation of the rotational race 32 of the rotational means 28 rotates the engaging means 16 with respect to the vehicle to allow selectable directional adjustment of the engaging means 16 with respect to the vehicle, and thereby control direction of the vehicle when the engaging means 16 is advancing across the support surface.

The rotational means 28 may include an actuation member 34. The actuation member 34 is coupled to the rotational race 32 for rotating the rotational race 32 with respect to the stationary race 30 when the actuation means 36 is actuated.

An actuation means 36 may be provided for rotating the rotational race 32 with respect to the stationary race 30. The actuation means 36 is coupled to the actuation member 34 of the rotational means 16 so that actuation of the actuation means 36 moves the actuation member 34 of the rotational means 28 to rotate the rotational race 32. The actuation means 36 may comprise an actuation ram 38 operationally coupled to the actuation member 34 of the rotational means 28. The actuation ram 38 is coupled to the hydraulic system of the vehicle such that actuation of the actuation ram 38 lengthens or shortens the actuation ram 38 to rotate the rotational race 32.

A securing member 40 is coupled to the stationary race 30 of the rotational means 28 and is mountable to the vehicle to inhibit rotation of the stationary race 30 with respect to the rotational race 32 when the direction of travel of the engaging means 16 is being adjusted.

The securing member 40 comprises at least one securing portion 42 for coupling to the vehicle to inhibit movement of the stationary race 30 with respect to the rotational race 32 of the rotation means. The securing member 40 may also comprise a band portion 44 coupled to the securing portion 42. The band portion 44 embraces a portion of the stationary race 30 to inhibit rotation of the stationary race 30 when the securing portion 42 is coupled to the vehicle.

The turning assembly 12 may include a shroud member 46 positioned between the shaft member 14 and the engaging means 16. The shroud member 46 extends over a portion of the engaging means 16 so that the shroud member 46 inhibits inadvertent damage to the engaging means 16 when the engaging means 16 is advanced along the support surface.

A drive means 48 for actuating the engaging means 16 to advance the engaging means 16 across the support surface. The drive means 48 is coupled to the shroud member 46, and in turn the drive means 48 is coupled to the engaging means 16. The drive means 48 selectively rotates the engaging means 16 to advance the engaging means 16 across the support surface when the drive means 48 is actuated by a user.

The drive means 48 may comprise a hydraulic motor 50 which may be operationally coupled to a hydraulic system of the vehicle, or optionally may be coupled to a hydraulic system separate of any system on the vehicle. The hydraulic motor 50 selectively actuates the engaging means 16 to advance the engaging means 16 forward and backward across the support surface when the hydraulic motor 50 is actuated by the user. Optionally, the drive means 48 could comprise an electrically driven motor or similar device.

The ram member 26, actuation means 36 and the hydraulic motor 50 may be coupled to the hydraulic system of the vehicle. A control assembly 52 may be positioned in the cab of the vehicle and operationally coupled to the hydraulic system of the vehicle to allow the user to control the ram member 26, actuation means 36 and the hydraulic motor 50 from the cab of the vehicle when the control assembly 52 is actuated by the user.

Figure 2:
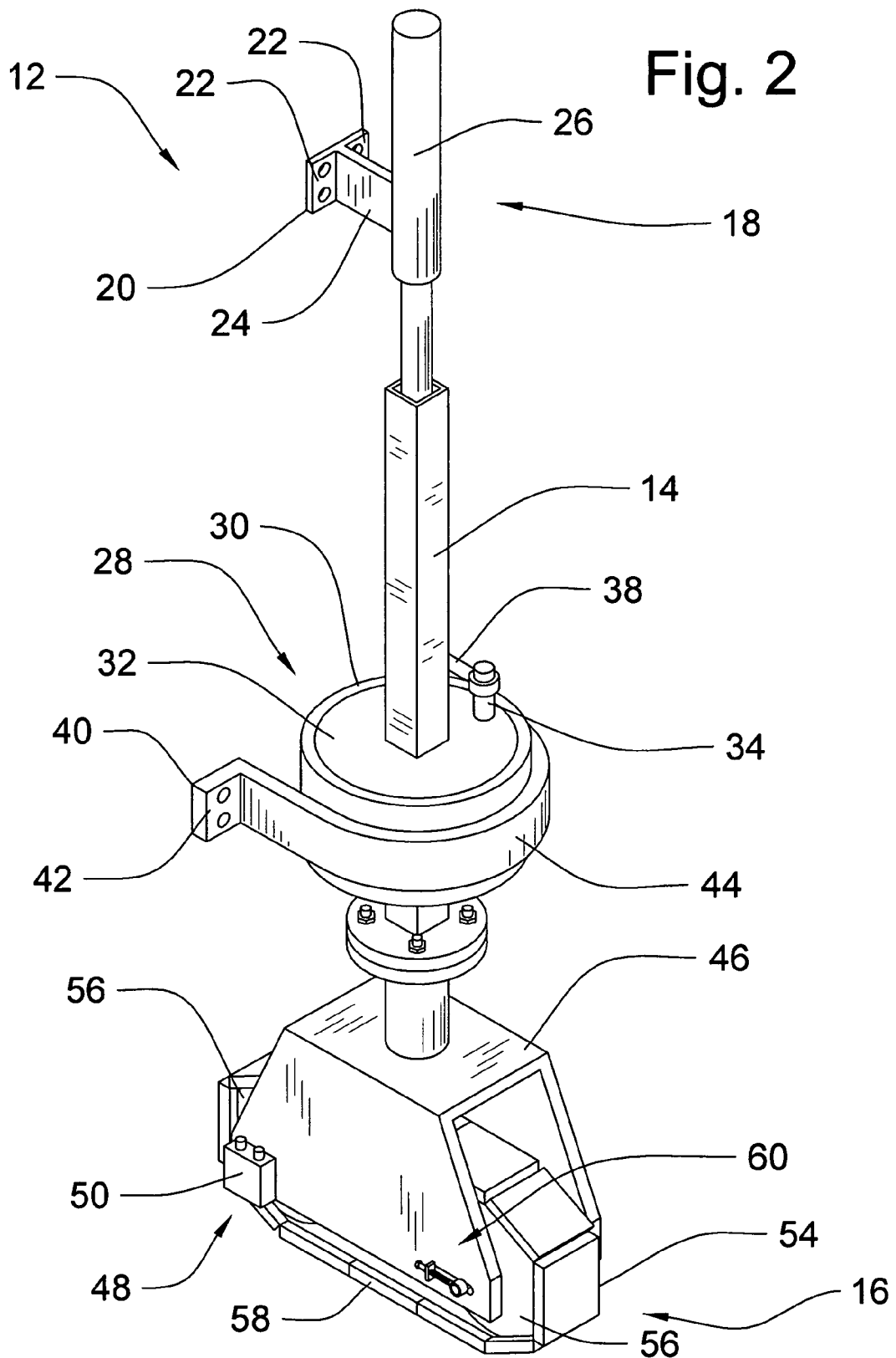
FIG. 2 is an enlarged perspective view of the present invention.
Figure 3:
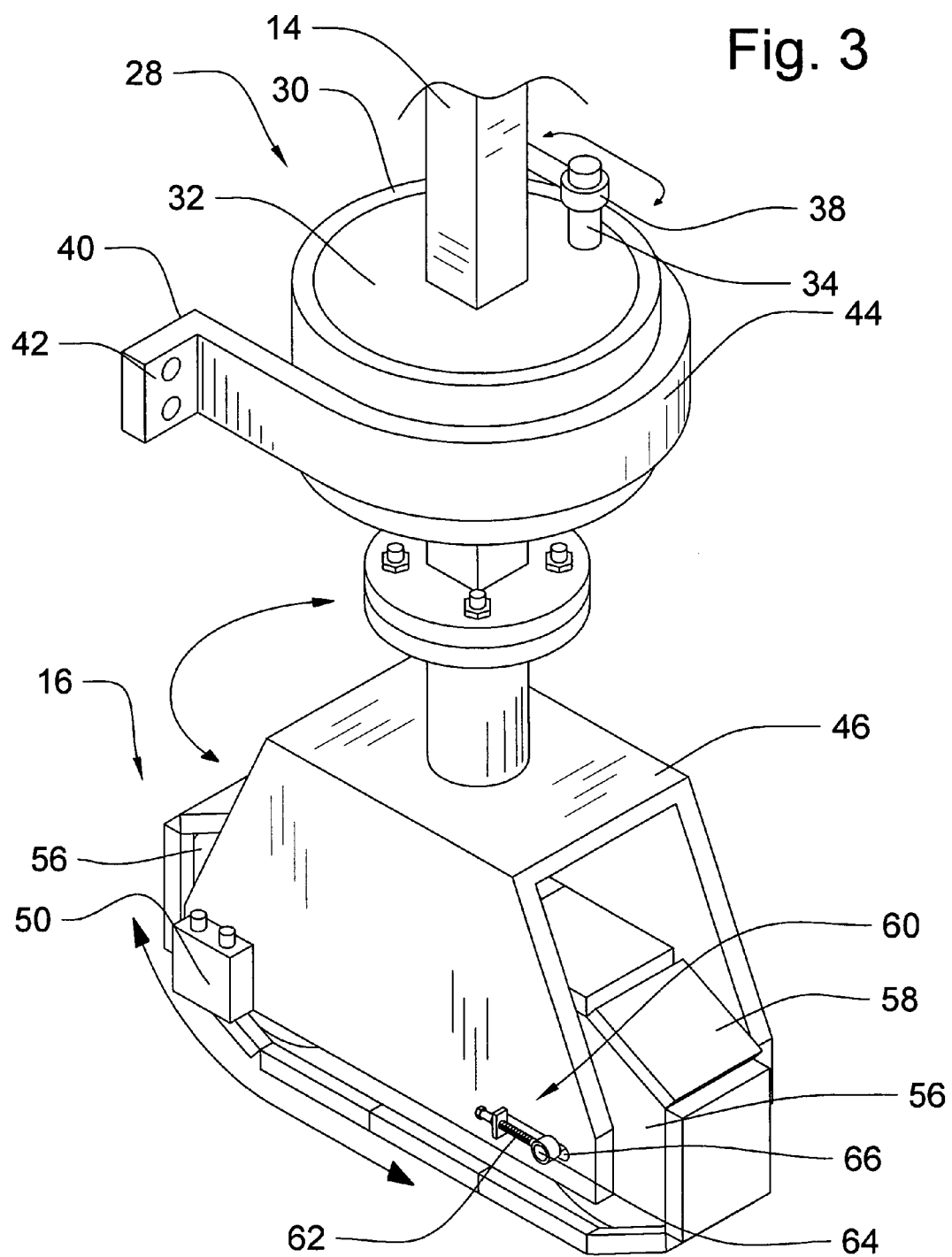
FIG. 3 is a enlarged perspective view of the rotational means and engaging means of the present invention.

In an embodiment, as shown in FIGS. 1 through 3, the engaging means 16 comprises a track assembly 54 rotationally mounted on the shroud member 46 for advancing along the support surface to move the end of the vehicle.

The track assembly 54 comprises a plurality of rollers 56 and an endless track member 58. One or more of the rollers 56 are coupled to the drive means 48 to rotate the rollers 56 with respect to the shroud member 46. The endless track member 58 extends around the rollers 56 so that rotation of the rollers 56 advances the endless track member 58 in a continuous circuit around the rollers 56. The endless track member 58 engages the support surface and advances along the support surface when the endless track member 58 advances around the rollers 56.

An adjustment means 60 may be provided for adjusting a distance between the rollers 56 of the track assembly 54 to maintain optimum tension in the endless track member 58 of the track assembly 54. The adjustment means 60 is mounted on the shroud member 46 and one of the rollers 56 of the track assembly 54 such that actuation of the adjustment means 60 adjusts the distance between the end most rollers 56. The adjustment means 60 comprises a pair of adjustment members 62 being coupled to an axle 64 of the associated one of the rollers 56 on opposite sides of the shroud member 46. Each of the adjustment members 62 are threadably coupled to the shroud member 46 so that rotation of the adjustment members 62 slides the axle 64 of the associated one of the rollers 56 along slots 66 in the shroud member 46 to adjust the distance between the rollers 56 to adjust the tension of the endless track member 58 extending around the rollers 56.

Figure 4:
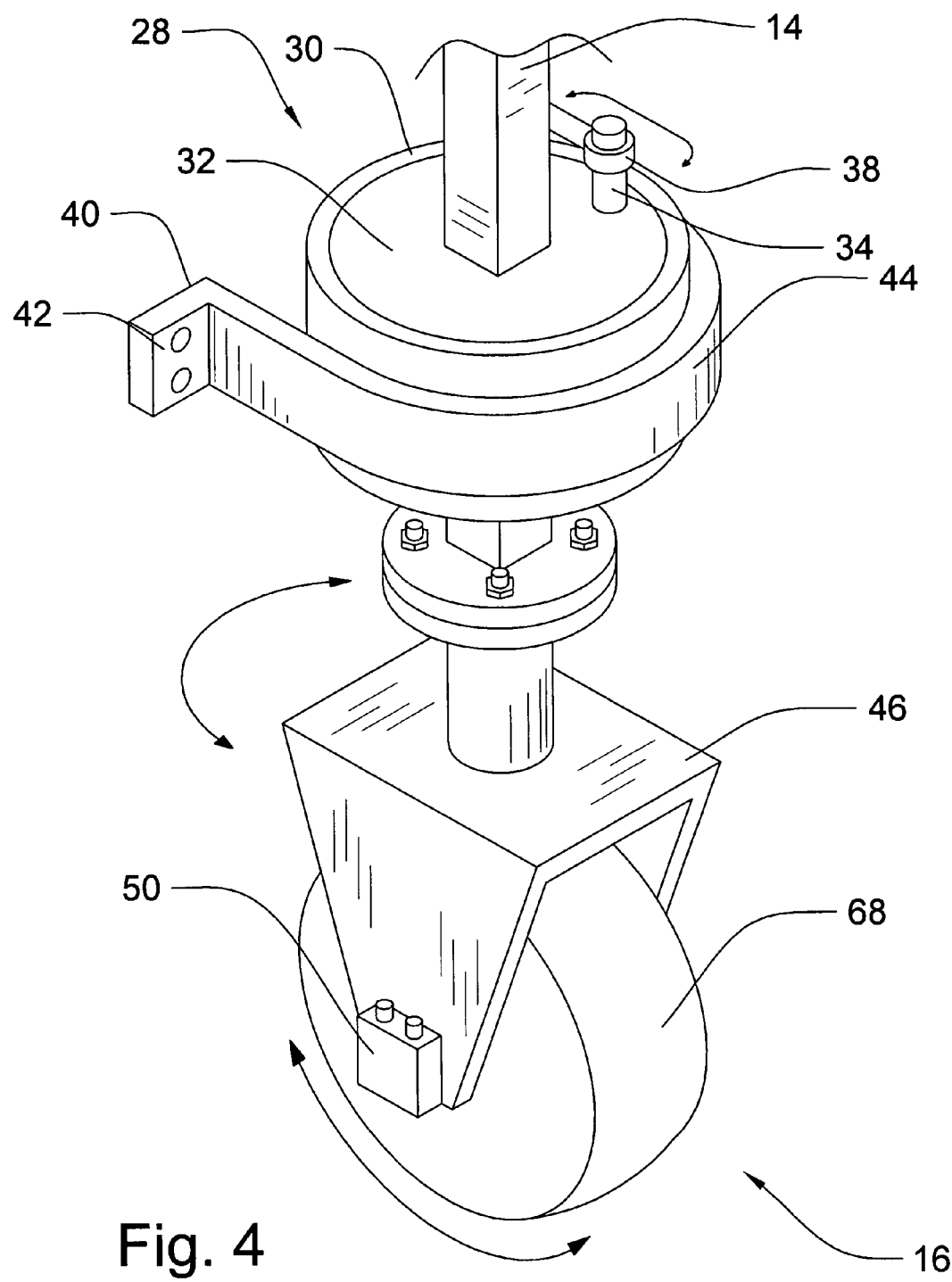
FIG. 4 is a enlarged perspective view of the rotational means and an embodiment of the engaging means of the present invention.
Figure 5:
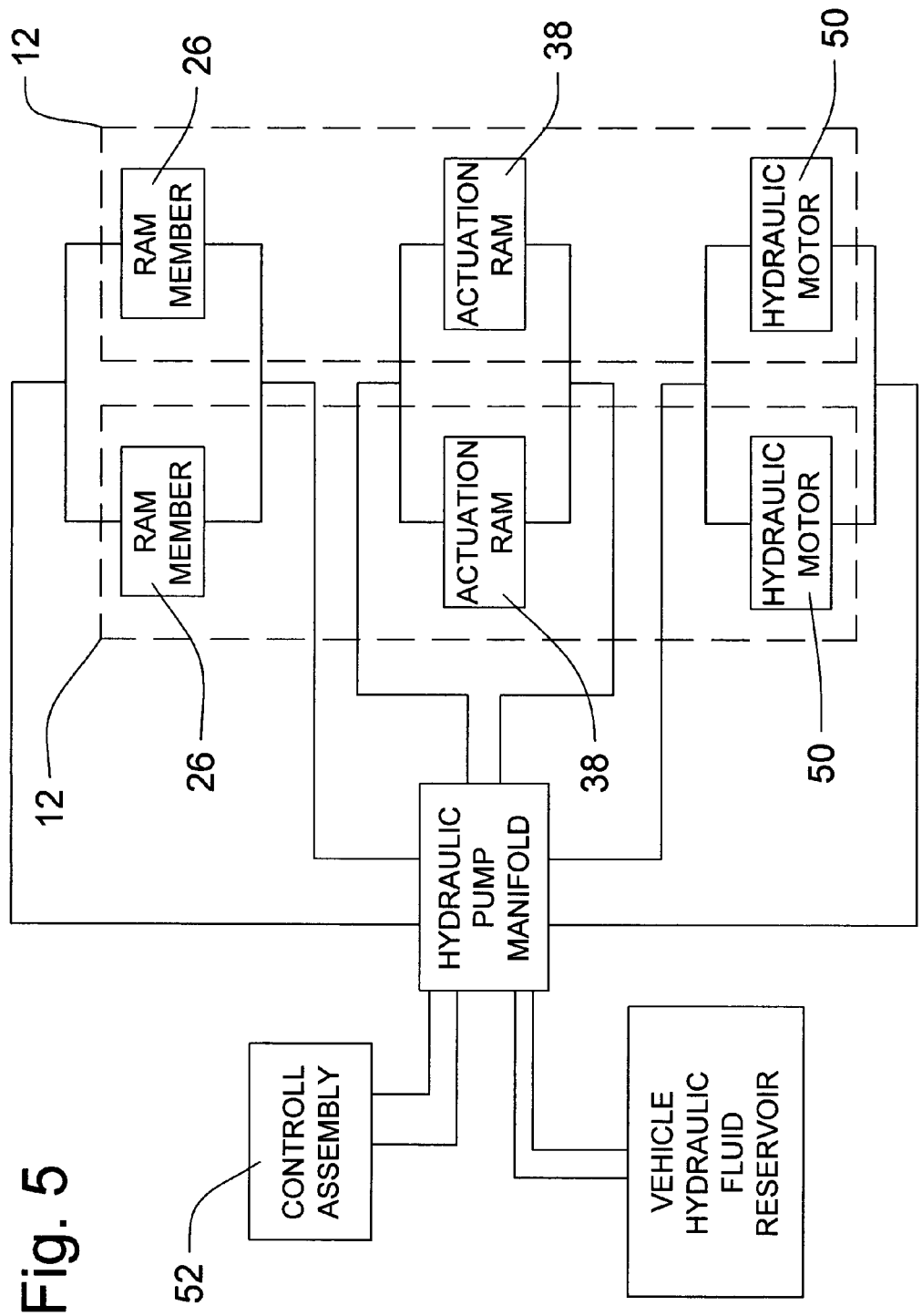
FIG. 5 is a diagrammatic representation of the present invention.

In an embodiment, as shown in FIG. 4, the engaging means 16 comprises a wheel 68 rotatably mounted to the shroud member 46 for rolling across the support surface to move the end of the vehicle when the engaging means 16 is actuated by the drive means 48.

In use, the turning assembly 12 is coupled to either the front or the back of the vehicle. When needed, the user actuates the control assembly 52 to actuate ram member 26 and to extend the shaft member 14 from the vehicle and engage the engaging means 16 with the support surface and to lift the end of the vehicle from the support surface. The user then actuates the controls assembly to actuate the hydraulic motor 50 to start the engaging means 16 advancing across the support surface in the desired direction and uses the control assembly 52 to actuate the actuation means 36 to rotate the rotational race 32 with respect to the stationary race 30 which rotates the shaft member 14 to provide further control of the direction in which the engaging means 16 is directed to turn the end of the vehicle. This allows the vehicle to be turned in spaces that the vehicle would not normally be turned on its own wheels or tracks due to the large turning radius of the vehicle. Once the user has completed the turn, the control assembly 52 is used to prevent the hydraulic motor 50 from turning the engaging means 16 and the ram member 26 is actuated to raise the engaging means 16 from the support surface and allow the associated end of the vehicle to contact the support surface to allow the vehicle continue in a new direction.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lifting and steering system for facilitating turning of a vehicle, the vehicle rotation system comprising:
    at least one turning assembly for coupling to the vehicle, said turning assembly comprising a shaft member being selectively extendable from the vehicle such that said turning assembly selectively engages a support surface beneath the vehicle to lift a portion of the vehicle off of the support surface while a portion of the vehicle remains in contact with the support surface; and
    said turning assembly comprising an engaging means for engaging the support surface when shaft member of said turning assembly is extended from the vehicle, said engaging means being coupled to said shaft member, said engaging means being capable of advancing along the support surface to rotate the portion of the vehicle lifted off of the support surface around a portion of the vehicle remaining in contact with the support surface;
    wherein said shaft member is elongate with a longitudinal axis, said shaft member being extendably movable along the longitudinal axis of said shaft member to move the engaging means along the longitudinal axis; and
    wherein said shaft member is rotatable about the longitudinal axis of said shaft member such that said engaging means is rotated about the longitudinal axis of said shaft member when said shaft member is rotated.

2. The lifting and steering system as set forth in claim 1, wherein said turning assembly comprises a lifting means for extending said engaging means from the vehicle to engage the support surface, said lifting means being operationally coupled to said shaft member such that said lifting means selectively extends and retracts said engaging means with respect to the vehicle.

3. The lifting and steering system as set forth in claim 2, wherein said turning assembly comprises a mounting member, said mounting member being coupled to said lifting means, said mounting member for being secured to the vehicle to secure said lifting means to the vehicle.

4. The lifting and steering system as set forth in claim 3, wherein said mounting member comprises at least one mounting portion for securing to the vehicle to secure said lifting means to the vehicle.

5. The lifting and steering system as set forth in claim 3, wherein said lifting means comprises a ram member being operationally coupled to said shaft member for selectively extending and retracting said engaging means with respect to the vehicle, said ram member for being operationally coupled to the vehicle to allow a user of the vehicle to actuate the ram member to selectively extend and retract said engaging means with respect to the vehicle.

6. The lifting and steering system as set forth in claim 2, wherein said turning assembly comprises a rotational means for rotating said engaging means with respect to said lifting means, said rotational means being operationally coupled to said shaft member to selectively rotate said shaft member to control the direction of travel of said engaging means when said engaging means is advancing along the support surface.

7. A lifting and steering system for facilitating turning of a vehicle, the vehicle rotation system comprising:
    at least one turning assembly for coupling to the vehicle, said turning assembly comprising a shaft member being selectively extendable from the vehicle such that said turning assembly selectively engages a support surface beneath the vehicle to lift a portion of the vehicle off of the support surface while a portion of the vehicle remains in contact with the support surface; and
    said turning assembly comprising an engaging means for engaging the support surface when shaft member of said turning assembly is extended from the vehicle, said engaging means being coupled to said shaft member, said engaging means being capable of advancing along the support surface to rotate the portion of the vehicle lifted off of the support surface around a portion of the vehicle remaining in contact with the support surface;
    wherein said turning assembly comprises a lifting means for extending said engaging means from the vehicle to engage the support surface, said lifting means being operationally coupled to said shaft member such that said lifting means selectively extends and retracts said engaging means with respect to the vehicle;
    wherein said turning assembly comprises a rotational means for rotating said engaging means with respect to said lifting means, said rotational means being operationally coupled to said shaft member to selectively rotate said shaft member to control the direction of travel of said engaging means when said engaging means is advancing along the support surface;
    wherein said rotational means comprises a stationary race and a rotational race, said rotational race being operationally coupled to said stationary race in a manner permitting rotation of said rotational race with respect to said stationary race, said stationary race for being coupled to the vehicle to inhibit rotation of said stationary race, said rotational race being operationally coupled to said shaft member such that actuation of said rotational race of said rotational means rotates said engaging means with respect to the vehicle to allow selectable directional adjustment of said engaging means with respect to the vehicle to control direction of the vehicle when said engaging means is advancing across the support surface.

8. The lifting and steering system as set forth in claim 7, wherein said rotational means comprises an actuation member being coupled to said rotational race for rotating said rotational race with respect to said stationary race when said actuation member is actuated.

9. The lifting and steering system as set forth in claim 8, further comprising:
    an actuation means for rotating said rotational race with respect to said stationary race, said actuation means being operationally coupled to said actuation member of said rotational means such that actuation of said actuation means moves said actuation member of said rotational means to rotate said rotational race.

10. The lifting and steering system as set forth in claim 7, further comprising:
    a securing member being coupled to said stationary race of said rotational means, said securing member for being coupled to the vehicle to inhibit rotation of said stationary race with respect to said rotational race when the direction of travel of said engaging means is being adjusted.

11. The lifting and steering system as set forth in claim 1, wherein said turning assembly comprises a shroud member coupled between said shaft member and said engaging means, said shroud member extending over a portion of said engaging means such that said shroud member inhibits inadvertent damage to said engaging means when said engaging means is advancing along the support surface; and further comprising:
    a drive means for actuating said engaging means to advance said engaging means across the support surface, said drive means being coupled to said shroud member such that said drive means is operationally coupled to said engaging means, said drive means selectively advancing said engaging means across the support surface when said drive means is actuated by a user.

12. The lifting and steering system as set forth in claim 11, wherein said drive means comprises a hydraulic motor for being operationally coupled to a hydraulic system of the vehicle, said hydraulic motor selectively actuating said engaging means to advance said engaging means forward and backward across the support surface when said hydraulic motor is actuated by the user.

13. The lifting and steering system as set forth in claim 1, wherein said engaging means comprises a track assembly being operationally coupled to said shaft member, said track assembly being for advancing along the support surface to move the end of the vehicle when said engaging means is actuated by the user.

14. The lifting and steering system as set forth in claim 13, wherein said track assembly comprises a plurality of rollers and an endless track member, said rollers being operationally coupled to said shaft member such that said rollers are rotatable with respect to said shaft member, said endless track member extending around said rollers such that rotation of said rollers advances said endless track member in a continuous circuit around said rollers, said endless track member being for engaging the support surface and advancing along the support surface when said endless track member advances around said rollers.

15. The lifting and steering system as set forth in claim 1, wherein said engaging means comprises a wheel being rotatably coupled to said shaft member, said wheel being for rolling across the support surface to move the end of the vehicle when said engaging means is actuated by the user.

16. The lifting and steering system of claim 7, wherein said turning assembly comprises a mounting member, said mounting member being coupled to said lifting means, said mounting member for being secured to the vehicle to secure said lifting means to the vehicle;
- wherein said mounting member comprises at least one mounting portion for securing to the vehicle to secure said lifting means to the vehicle;
- wherein said mounting member comprises an extension portion coupled between said mounting portion and said lifting means for positioning said lifting means at a desired distance from the vehicle;
- wherein said lifting means comprises a ram member being operationally coupled to said shaft member for selectively extending and retracting said engaging means with respect to the vehicle, said ram member for being operationally coupled to the vehicle to allow a user of the vehicle to actuate the ram member to selectively extend and retract said engaging means with respect to the vehicle;
- wherein said rotational means comprises an actuation member being coupled to said rotational race for rotating said rotational race with respect to said stationary race when said actuation member is actuated;
- an actuation means for rotating said rotational race with respect to said stationary race, said actuation means being operationally coupled to said actuation member of said rotational means such that actuation of said actuation means moves said actuation member of said rotational means to rotate said rotational race;
- a securing member being coupled to said stationary race of said rotational means, said securing member for being coupled to the vehicle to inhibit rotation of said stationary race with respect to said rotational race when the direction of travel of said engaging means is being adjusted;
- wherein said turning assembly comprises a shroud member coupled between said shaft member and said engaging means, said shroud member extending over a portion of said engaging means such that said shroud member inhibits inadvertent damage to said engaging means when said engaging means is advancing along the support surface;
- a drive means for actuating said engaging means to advance said engaging means across the support surface, said drive means being coupled to said shroud member such that said drive means is operationally coupled to said engaging means, said drive means selectively advancing said engaging means across the support surface when said drive means is actuated by a user;
- wherein said drive means comprises a hydraulic motor for being operationally coupled to a hydraulic system of the vehicle, said hydraulic motor selectively actuating said engaging means to advance said engaging means forward and backward across the support surface when said hydraulic motor is actuated by the user; and
- wherein said engaging means comprises a wheel being rotatably coupled to said shaft member, said wheel being for rolling across the support surface to move the end of the vehicle when said engaging means is actuated by the user.

17. A lifting and steering system for facilitating turning of a vehicle, the vehicle rotation system comprising:
   a vehicle;
   at least one turning assembly mounted on the vehicle, the turning assembly comprising:
      a mounting structure mounted on the vehicle;
      an elongate shaft structure mounted on and selectively extendable and retractable with respect to the mounting structure, the shaft structure being movable along its longitudinal axis during extension and retraction;
      a ram structure coupled to and acting on the shaft structure to selectively extend and retract the shaft structure with respect to the mounting structure; and
      an engaging structure configured to contact the support surface when the shaft member is extended from the mounting structure and be removed from contact with the support surface when the shaft member is retracted, the engaging structure being coupled to a lower portion of the shaft member, the engaging structure being rotatable about a substantially horizontal axis to advance the turning assembly along the support surface, the engaging structure being located below the ram structure;
   wherein the shaft structure is rotatable with respect to the mounting structure about the longitudinal axis of the shaft structure to facilitate steering of the engaging structure.

18. The lifting and steering system as set forth in claim 17, wherein the mounting structure and the shaft structure are arranged such that the longitudinal axis of the shaft member is substantially vertically oriented.

19. The lifting and steering system as set forth in claim 17, wherein the ram structure is located vertically above the shaft structure such that the ram structure acts in a substantially vertically downward direction on the shaft structure when extending the shaft structure.

20. The lifting and steering system as set forth in claim 17, additionally comprising a drive structure configured to rotate the engaging structure so that engaging structure causes the turning assembly and the vehicle to move with respect to the support surface.

* * * * *